US009679482B2

United States Patent
Werner et al.

(10) Patent No.: US 9,679,482 B2
(45) Date of Patent: Jun. 13, 2017

(54) ROAD AND PATH LIGHTING SYSTEM (71) Applicant: ZUMTOBEL LIGHTING GMBH, Dornbirn (AT)

(72) Inventors: Walter Werner, Dornbirn (AT); Martin Siegel, Bodolz (DE)

(73) Assignee: ZUMTOBEL LIGHTING GMBH, Dornbirn (AT)

( * ) Notice: Subject to any disclaimer, the term of this patent is extended or adjusted under 35 U.S.C. 154(b) by 12 days.

(21) Appl. No.: 14/396,706

(22) PCT Filed: Apr. 23, 2013

(86) PCT No.: PCT/EP2013/058364
§ 371 (c)(1),
(2) Date: Oct. 23, 2014

(87) PCT Pub. No.: WO2013/160284
PCT Pub. Date: Oct. 31, 2013

(65) Prior Publication Data
US 2015/0145698 A1    May 28, 2015

(30) Foreign Application Priority Data
Apr. 24, 2012   (DE) .................... 10 2012 206 691

(51) Int. Cl.
*G08G 1/00* (2006.01)
*G08G 1/065* (2006.01)
(Continued)

(52) U.S. Cl.
CPC .............. *G08G 1/095* (2013.01); *F21S 8/086* (2013.01); *G08G 1/0112* (2013.01);
(Continued)

(58) Field of Classification Search
CPC combination set(s) only.
See application file for complete search history.

(56) References Cited

U.S. PATENT DOCUMENTS

2006/0056855 A1* 3/2006 Nakagawa ............... G09F 9/33
398/183
2006/0225329 A1* 10/2006 Morrow .................... G09F 7/04
40/591
(Continued)

FOREIGN PATENT DOCUMENTS

CN      102371937       3/2012
DE      19625197        1/1998
(Continued)

OTHER PUBLICATIONS

International Search Report for PCT/EP2013/058364, English translation attached to original, Both completed by the European Patent Office on Jul. 23, 2013, All together 5 Pages.

*Primary Examiner* — Travis Hunnings
(74) *Attorney, Agent, or Firm* — Brooks Kushman P.C.

(57) ABSTRACT

A road and path lighting system having a lighting apparatus including a projection unit for projecting signals onto a projection area, and a communications module designed to control the projection unit on the basis of incoming input signals. The system also includes a lighting apparatus having a light source, a transmission unit, and a communications module for actuating the light source on the basis of data which is transmitted by the transmission unit, and a wireless data communications unit by which the transmission unit is connected wirelessly to a receiver of the communications module. The transmission unit preferably has an independent energy source. The transmission unit can also be designed as a sensor unit having a sensor, the sensor unit being provided on the lighting apparatus, in particular on the outside thereof. Further disclosed is, a method for outputting signals of the road and path lighting system.

14 Claims, 3 Drawing Sheets

(51) Int. Cl.
  *G08G 1/095* (2006.01)
  *H05B 37/02* (2006.01)
  *G08G 1/01* (2006.01)
  *G08G 1/07* (2006.01)
  *G08G 1/08* (2006.01)
  *G08G 1/0967* (2006.01)
  *F21S 8/08* (2006.01)
  *F21W 131/103* (2006.01)
  *F21Y 115/10* (2016.01)

(52) U.S. Cl.
  CPC ......... *G08G 1/0116* (2013.01); *G08G 1/0133* (2013.01); *G08G 1/0141* (2013.01); *G08G 1/07* (2013.01); *G08G 1/08* (2013.01); *G08G 1/096716* (2013.01); *G08G 1/096775* (2013.01); *G08G 1/096791* (2013.01); *H05B 37/0218* (2013.01); *H05B 37/0227* (2013.01); *H05B 37/0254* (2013.01); *H05B 37/0263* (2013.01); *H05B 37/0272* (2013.01); *H05B 37/0281* (2013.01); *F21W 2131/103* (2013.01); *F21Y 2115/10* (2016.08); *Y02B 20/42* (2013.01); *Y02B 20/46* (2013.01); *Y02B 20/72* (2013.01)

(56) References Cited

U.S. PATENT DOCUMENTS

2006/0267795 A1    11/2006   Draaijer et al.
2007/0109142 A1*   5/2007    McCollough, Jr. .... G08B 21/12
                                                       340/641
2008/0044224 A1*   2/2008    Bleiner ............ G08G 1/096716
                                                         404/9
2010/0001652 A1    1/2010    Damsleth
2010/0029268 A1    2/2010    Myer et al.
2010/0234071 A1*   9/2010    Shabtay ............... H04B 7/0408
                                                       455/562.1
2010/0283590 A1*   11/2010   Tee ........................ A42B 3/044
                                                       340/432
2011/0187558 A1*   8/2011    Serex ................... G08G 1/0962
                                                       340/905
2011/0199231 A1*   8/2011    Loiselle ..................... G09F 9/33
                                                       340/907
2012/0044090 A1    2/2012    Kahler et al.
2013/0058536 A1*   3/2013    Levin ....................... A61B 5/18
                                                       382/104
2013/0147638 A1*   6/2013    Ricci ......................... G06F 9/54
                                                       340/905
2014/0203923 A1*   7/2014    Lai .......................... B62J 6/001
                                                       340/432
2014/0320317 A1*   10/2014   Grauer ............ G08G 1/096716
                                                       340/907

FOREIGN PATENT DOCUMENTS

DE      202007002125      6/2007
DE      102005063443      1/2008
WO      2005096511        10/2005

* cited by examiner

ROAD AND PATH LIGHTING SYSTEM

CROSS-REFERENCE TO RELATED APPLICATION

This application is the U.S. national phase of PCT Application No. PCT/EP2013/058364 filed on Apr. 23, 2013, which claims priority to DE Patent Application No. 10 2012 206 691.8 filed on Apr. 24, 2012, the disclosures of which are incorporated in their entirety by reference herein.

The present invention relates to an exterior lighting system, particularly a road or path lighting system with an actuatable light source, and to a method for outputting signals, for example visual signals or data signals, by means of the aforementioned system.

The prior art discloses road or path lighting systems that usually comprise one or more lighting apparatuses in the form of street lamps with a post and a light source provided at the upper end thereof. These known exterior lighting systems are fundamentally used to illuminate the surroundings (for example a road or a pedestrian path) in poor weather conditions or at twilight or at night.

In order to match the lighting to relevant ambient conditions (e.g. light conditions) or to respond to a nearby object on the basis thereof, the existent lighting apparatuses can be provided with a sensor system. Particularly in the case of tall posts or on heavily segmented terrain, it is disadvantageous for the sensor system to be provided on or near to the luminaire head. Instead, an additional box containing the sensor system is mounted on the post at a predetermined height (usually 3 to 5 m above the ground); that is to say at approximately mid-height of the post, where the best information about the surroundings, for example when presence sensors or the like are used, can be obtained. However, fitting appropriate sensors to the post has entailed a high level of complexity to date, since the power supply for the sensor system has had to be ensured and also measures have had to be provided in order to ensure that the sensor signals are transmitted to the luminaire head. By way of example, it has been necessary to drill a hole in the post in order to provide an electrical connection for the sensor using the electrical equipment of the luminaire, which firstly entails a relatively high level of complexity and secondly can lead to problems for warranty reasons too and also further legal reasons.

Furthermore, previously known road or path lighting systems are not provided for the purpose of taking a situation as a basis for indicating events in the surroundings by specifically actuating a light source and outputting light or data information or for the purpose of providing information about said events in another way. By way of example, hazard situations have been indicated in road traffic to date merely by means of ordinary road signs or LED displays (for example traffic management systems) that are designed specifically for a particular purpose. This requires the use of specially adjusted electronic and mechanical apparatuses, which results in an increase in the costs in the traffic system, since a change in the information to be displayed requires replacement or at least adjustment of the installation itself. Furthermore, electronic traffic management systems, in particular, are limited to a particular set of road signs and the visibility thereof is also restricted in poor weather conditions (e.g. in fog or smoke).

It is therefore an object of the invention to provide a road or path lighting system and a method for outputting signals by means of such a system in a simple and inexpensive manner, which system or method simultaneously allows flexible situation-dependent light output and preferably information output or signal output in general.

This object is achieved by the subject matter of the independent claims. The dependent claims develop the central concept of the invention in a particularly advantageous manner.

According to a first aspect, the invention relates to a road and path lighting system having at least one or else a plurality of lighting apparatuses, each with at least one projection unit for projecting signals onto a projection area, and a communication module that is designed so as to control the projection unit on the basis of incoming input signals.

The use of a projection unit in a lighting apparatus allows any individually prescribed information to be output in the form of a light output depending on the situation on the basis of appropriate input signals. In addition, the system is not limited to a prescribed set of information or signals, since the projection unit can be used to output any conceivable, in particular visual, information or signals.

According to a second aspect, the invention relates to a road and path lighting system having a lighting apparatus with a light source, a sensor unit having a sensor, wherein the sensor unit is provided on the lighting apparatus and at an interval from the light source, a communication module for actuating the light source on the basis of the data captured by means of the sensor, and a wireless data communication unit that connects the sensor unit to a receiver of the communication module only wirelessly, wherein the sensor unit preferably has an independent power source.

According to a third aspect, the invention relates to a road and path lighting system having a lighting apparatus with a light source, a transmission unit having a transmitter, wherein the transmission unit is at an interval from the light source, a communication module for actuating the light source on the basis of data transmitted by means of the transmission unit, and
a wireless data communication unit that connects the transmission unit to a receiver of the communication module only wirelessly, wherein the transmission unit preferably has an independent power source.

The transmission unit may fundamentally also be in the form of a sensor unit as described previously, which then has the aforementioned sensor and is preferably provided on (the outside of) the lighting apparatus.

The sensor unit or transmission unit wirelessly connected to the communication module can be used to provide a lighting apparatus or a system that has said lighting apparatus in a simple and inexpensive manner and without the provision of drill holes or the separate electrical connection of cables, which system allows flexible and, in particular, situation-dependent light output and preferably information output via the light source on the basis of the respective sensors or transmission unit.

According to the invention, the aforementioned aspects of the invention may be present individually or in any combination. Furthermore, the following, preferred features may be provided in this case:

By way of example, the projection unit may be or have a light source, provided for lighting, for the lighting apparatus itself or a further (that is to say additional) light source, such as a laser unit or an LED luminaire.

The projection area may be any area that is suitable for projection, that is to say particularly an even and preferably unicolor area, for example a road or path surface or (building) wall or an additional projection area, such as a projection panel. The projection unit is preferably designed such that it can project a signal or different signals onto one or more projection areas. The signals that are output by the projection unit are preferably light signals that form a visual signal on the projection area.

The communication module is preferably designed such that the incoming input signals can be taken as a basis for generating output signals and outputting the latter to the surroundings. The output is preferably effected via power line communication or short-haul radio or using the system or the communication module as a relay station. Preferably, the output signals are output to a traffic management center or a car-to-car communication network or another communication module of a further lighting apparatus in the system or to other receivers (for example transmission unit; mobile telephone of a passer-by, etc.). In this case, the output signals are preferably data signals that can be converted into visual and/or audio signals at a receiver, for example in a traffic management center or a vehicle or on another reception appliance (for example smartphone).

The input signals are preferably likewise data signals that can be transmitted to the communication module via power line communication or from sensors, for example a sensor unit in the system or a surrounding road system, or from a car-to-car communication network (for example by means of short-haul radio or the like) or another, preferably external, transmission unit.

The communication module is preferably designed so as to actuate the lighting apparatus, preferably the light source of the lighting apparatus and/or the projection unit, on the basis of the data captured and transmitted by means of the sensor or the sensors or transmitted from the transmission unit and/or to output it as output signals to the surroundings. To this end, a wireless data communication unit is preferably provided that connects the sensor unit, having the sensor, or the transmission unit to a receiver of the communication module only wirelessly. For autarkic operation, the sensor unit or the transmission unit preferably has an independent power source. This power source is preferably a solar module, for example with an energy buffer, or an internal energy store, such as a storage battery.

The sensors of the sensor unit (or, by way of example, also in a transmission unit) are preferably chosen from the group of light sensors, temperature sensors, motion sensors or smoke sensors or a combination thereof. The communication module is then preferably designed such that it actuates the light source on the basis of the light conditions sensed by means of the light sensor, on the basis of the temperature sensed by means of the temperature sensor, on the basis of, preferably mobile, objects situated in the sensing region of the motion sensor and/or on the basis of smoke occurrence or smoke density sensed by means of the smoke sensor. Furthermore, other data captured by the sensors are also conceivable for actuation. In addition, other kinds of sensors may also be alternatively or additionally provided, the captured results from which can be taken as a basis for actuating the light source via the communication module. The sensor or the sensor unit is preferably provided on the outside of the lighting apparatus, particularly preferably on the outside of a post that has the lighting apparatus and the upper end of which preferably has the light source arranged on it.

The wireless connection between the sensor unit or transmission unit and the receiver of the communication module and also all the other wireless connections described in this application are preferably provided by means of short-haul radio, with transmission by means of the Bluetooth standard, particularly the Bluetooth 4.0 standard, preferably being provided.

The communication module is preferably designed such that the light source to be actuated can also be actuated on the basis of data from an external transmission module, such as the aforementioned transmission unit, that are transmitted to the communication unit wirelessly. Particularly preferably, the lighting apparatus or the communication module or the actuation of the light source can be parameterized by means of data that are transmitted to the communication module wirelessly or by wire, so as to be individually adjusted according to requirements. In this case, actuation of the light source or parameterization of the communication module can be executed or not executed on the basis of an authorization of the transmitter that transmits the data, such as the external transmission module.

In addition, the communication module may have a radio transmitter that is wirelessly connected (preferably via a short-haul radio) to other communication modules of other lighting apparatuses in the system, wherein the communication module is also designed so as to control or actuate the lighting apparatus on the basis of the data transmitted from the other communication modules of the other lighting apparatuses. This allows the provision of automatic and interactive information output or light output.

Furthermore, the communication module may have a processing unit in which the input signals, particularly the data captured by the sensor or transmitted from the transmission unit, are evaluated and converted into actuation signals or output signals. To this end, the processing unit may be directly connected either to the sensor unit or to the transmission unit or to the lighting apparatus. A data transmitter of the communication module, which data transmitter is preferably provided in the sensor unit or the transmission unit, and the receiver of the communication module, which receiver is preferably provided in the lighting apparatus, particularly preferably on the light source, together preferably provide the wireless connection between the sensor unit or the transmission unit and the receiver of the communication module.

Further advantages of the invention are described by way of example below using exemplary embodiments with reference to the drawings of the accompanying figures.

Figure 1:
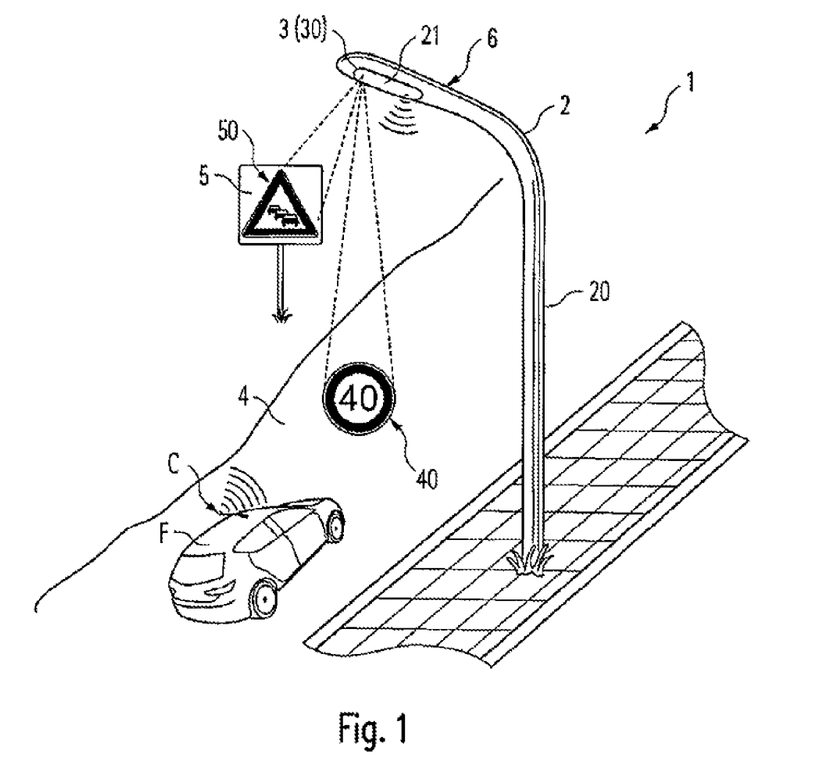
FIG. 1 shows a road or path lighting system according to a first exemplary embodiment.

FIG. 1 shows a road or path lighting system 1 (subsequently also referred to as a system) according to the invention. This system can also be referred to generally as an exterior lighting system. The system 1 has one or else a plurality of lighting apparatus(es) 2. The lighting apparatus 2 is preferably a lamppost 20 (subsequently also referred to as a post), the upper end of which has a light source 21 (30) arranged on it for the directional or nondirectional illumination of the surroundings of the lighting apparatus 2.

The lighting apparatus 2 has a projection unit 3 that can be used to project signals 40, 50 onto a projection area 4, 5. The projection area used is preferably already existent areas, such as a road or path surface 4 or a (building) wall. Alternatively or in addition, it is also possible to provide an additional projection area that comprises a projection panel 5, in particular. Preferably, the projection areas 4, 5 are even, blank and unicolor in order to present signals projected thereon in the best possible way. The projection unit 3 may preferably be designed such that it can also present a visual signal on uneven or oblique areas, with the projection unit 3 compensating for the unevennesses or the angle in relation to the projection area in a manner that is known for projectors, for example.

The projection unit 3 may have the light source 21, provided for lighting, of the lighting apparatus 2 or a further light source 30. In other words, the lighting apparatus 2 either only has the projection unit 3, which simultaneously serves as the light source 21 thereof, or the projection unit 3 is provided as an additional light source 30 besides a dedicated light source 21 of the lighting apparatus 2. In the exemplary embodiment in FIG. 1, the projection unit 3 is provided as an additional element of the road lighting; alternatively, it can, as already explained previously, use the light source 21, provided for lighting, of the lighting apparatus 1 itself for this operation. The light source 21, 30 of the projection unit 3 preferably has a laser unit. If a laser unit (for example a laser projector) is used as the light source 21, 20, a significant advantage over conventional projectors is that it is not necessary to use a focusing optical system, since the laser beam has an extremely great depth of field on account of the low divergence. In addition, projection by means of laser has the advantage, on account of the low divergence and high luminance thereof, of good perceptibility in comparison with standard light sources or else LED luminaires; even in poor visibility conditions as a result of fog or smoke. As an alternative to projection by means of laser, provision may also be made for the use of appropriate LED-based units (LED luminaires) or other light sources. Therefore, the projection of the relevant information or signals can take place in different ways and is not limited by the invention, so long as it reliably presents the relevant information.

The projection unit 3 is preferably mounted on the lighting apparatus 2 detachably or nondetachably by means of clamps, screws or the like in a suitable manner. It is also conceivable for the projection unit 3 to be used as a unit with the light source 21 of the lighting apparatus 2 or as a replacement for the latter in the lighting apparatus 2 such that projection in a desired direction is made possible. FIG. 1 shows a projection unit 3 that is fully integrated in the lighting apparatus 2 next to a light source 12 thereof by way of example.

Integration of the projection unit 3 into the luminaire or lighting apparatus 2 or light source 21 is particularly preferred for reasons of space and in order to reduce or avoid modification complexity for a previously existing lighting apparatus 2. If the projection unit 3 is in the form of a laser unit, the laser units or laser projectors, which are typically of much smaller design (in comparison with conventional projectors), result in distinctly more design options than with traditional projectors.

The direction of the projection is preferably of variable design or adjustable and is, as far as possible, not or only to some extent prescribed or limited by the direction of installation. When laser units (laser projectors) are used as the projection unit 3, this can advantageously be achieved from a technical point of view by micromirror arrays, for example (as implemented in the case of "Digital Light Processing", for example). The micromirror arrays are simultaneously used to produce the image and to determine the direction of projection. In this case, the current prior art allows up to 120° projection angles and more. Furthermore, it is also conceivable that, particularly on account of the small size of the aforementioned projection units 3, the projector itself can also be provided in mobile form, or implemented in mobile form, with little complexity, so that the entire spatial angle can be covered by combined movement of the micromirror arrays and of the projector per se.

The projection unit 3 may be designed such that it can project different signals 40, 50 onto a plurality of projection areas 4, 5, as shown by way of example in FIG. 1. In summary, the projection unit 3 can preferably project at least one signal or else a plurality of signals 40, 50 onto one or more projection areas 4, 5 (in each case together or in distributed form), where the signals transmitted as light signals are then reproduced as a visual signal 40, 50. In FIG. 1, the projection unit 3 projects two signals 40, 50, for example, one onto a road surface 4 and one onto a separate projection panel 5. The invention is naturally not limited to this exemplary embodiment, however.

The visual signals 40, 50 allow information such as warnings, prohibition signs, mandatory signs or the like to be visually presented. The projection unit 3 can be used to project such images onto the road surface 4 or generally onto a terrain or onto appropriate projection areas 5 in proximity to the lighting apparatus 2. These projection areas 4, 5 then serve as a kind of blank sign on which various information is presented as required. Besides warnings, it is also possible to project all other conceivable information onto the projection areas 4, 5, such as road signs, weather information, information pertaining to trade fairs or other events, advertizing in general, and the like. A projection unit 3 in such a form can be used by the lighting apparatus 2 or the system 1 to present (visual) information of any kind and hence to transmit it to road users.

In order to control the projection unit 3 in accordance with current circumstances or wishes, the system 1 also has a communication module 6 that is designed so as to control or actuate the projection unit 3 of the basis of incoming input signals. Such input signals may be data signals that are transmitted to the communication module 6 via power line communication (PLC), for example from a traffic management center. In this way, information and signals corresponding to the (current) traffic conditions (for example high traffic volume, queue, accident, poor weather conditions, etc.) can be projected onto the aforementioned projection areas 4, 5, for example in order to regulate the traffic in optimum fashion or to advise of hazards or other information.

Since lighting apparatuses 2 are usually already part of a controlled network (for example a traffic management center or the like), preferably no additional control infrastructure is required at least for (basic) implementation of the system 1. In addition, the use of an individually actuable projection unit 3 allows any conceivable information to be reproduced (directly visually; or else as data signals, as described below), so that the system 1 according to the invention is not limited to a particular set of signals. Hence, it is possible, without additional complexity, to react immediately to new and possibly unforeseeable circumstances. Therefore, the system 1 according to the invention allows flexible situation-dependent light output and information output in a simple and inexpensive manner.

Besides the transmission via PLC, the input signals may also be data signals from any, preferably external, transmission unit 10 (cf. FIGS. 2 and 3) or from sensors that are provided as a sensor unit 8 on the lighting apparatus 1, for example, or provided or integrated in the surrounding road system. By way of example, the latter sensors may be provided along a road at particular, preferably uniform, intervals and can sense the traffic volume, for example.

By way of example, the sensors may have light sensors, temperature sensors, motion sensors, smoke sensors and the like. The communication module 6 is then preferably designed such that it actuates the light source, particularly the projection unit 3 or else the light source 21 of the lighting apparatus 2, on the basis of the light conditions sensed by means of the light sensor, on the basis of the temperature sensed by means of the temperature sensor, on the basis of, preferably mobile, objects situated in the sensing region of the motion sensor and/or on the basis of a smoke density or a smoke occurrence sensed by means of the smoke sensor. In fog, for example, the projection unit 3 can thus be actuated such that it projects a fog warning and/or a speed limit indication onto a projection area 4, 5, while at the same time the light from the light source 21 of the lighting apparatus 2 is matched to the altered weather conditions, that is to say is switched on or intensified, for example. Similarly, it is possible for a queue warning to be generated by means of the projection unit 3, for example, when the number of passing vehicles F sensed by means of motion sensors exceeds a prescribed threshold value in a prescribed interval of time. In connection with the description of FIG. 2, the provision and use of sensors is also explained in more detail.

It is also conceivable for the input signals to be data signals that are transmitted from a car-to-car communication network C, as shown by way of example in the figures. A car-to-car communication network C is fundamentally known from vehicle technology and is used to interchange information, particularly warning information, among vehicles F or to transmit information between said vehicles.

The integration of the system 1 into a car-to-car communication network C therefore has the advantage that, by way of example, the initial information in the input signals that prompt the lighting apparatus 1 to visually present information or signals (e.g. warnings) may come from a vehicle F itself. The system 1 therefore makes it possible to engage in the existing car-to-car communication network C and to pick up the hazard reports transmitted between the vehicles F as input signals and to convert them into (visual or data) signals as appropriate. By way of example, a vehicle F involved in an accident that outputs a warning signal via car-to-car communication network C can simultaneously send said warning signal to the lighting apparatus 1, on the basis of which the communication module 6 actuates the projection unit 3 such that it generates an appropriate visual warning signal and projects it onto a surrounding projection area 4, 5. Hence, it is also possible to warn passers-by or other road users whose vehicles F have no car-to-car communication apparatus C, for example.

Conversely, it is also conceivable for the communication module 6 also to be designed to take the incoming input signals (for example from a traffic management center, sensors, a transmission unit 10, a car-to-car communication network C or the like) as a basis for generating output signals and to output the latter to the surroundings. To this end, the output signals can be transmitted to a traffic management center via PLC, for example. It is also possible for the output signals to be transmitted to surrounding receivers, for example within a car-to-car communication network C, via short-haul radio. It is also conceivable for the system 1 to act as a relay station and to transmit the output data to a car-to-car communication network C or else another communication module 6' (cf. FIG. 3) of a further lighting apparatus 2' in the system 1 or to a traffic management center or another receiver. If the system 1 acts as a relay station, it is also possible to reach receivers (vehicle drivers; traffic management center; etc.) outside a limited coverage area—for example a car-to-car communication network C—and to supply them with the appropriate information. As is also explained below, the output signals can be converted into visual and/or audio signals at a receiver, for example in a traffic management center or in a vehicle F.

Figure 4:
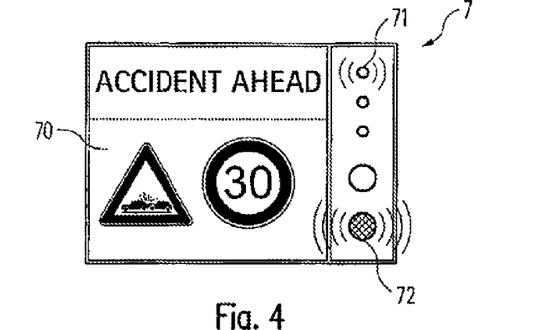
FIG. 4 shows a visual and audio indicator device in a vehicle with a car-to-car communication system.

If the lighting apparatus 2 transmits appropriate output signals to vehicles F in the surroundings as the relay station, these output signals received by the vehicles F, preferably in the car-to-car communication network C, can be visually and/or audibly output by means of a reproduction unit 7, for example (cf. FIG. 4). In this case, the communication between the lighting apparatus 2 and a vehicle F takes place in the same way as is provided for the car-to-car communication. Preferably, wireless near-view communication (short-haul radio; Bluetooth) is used.

The reproduction unit 7 may have a display 70 in which visual advice is reproduced graphically or as text. The visual advice can also be limited to a lamp element 71—for example an LED lamp—that flashes and/or lights up in an appropriate color when a warning signal is received from the lighting apparatus 2 via the car-to-car communication network C, for example. In addition, the reproduction unit 7 may have an audio reproduction apparatus 72, such as a loudspeaker, that can be used to reproduce warning tones or else a (pre)generated spoken text in accordance with the signal received from the lighting apparatus 1.

The system 1 or the lighting apparatus 2 therefore not only transmits appropriate information in the form of output signals but is also provided for the purpose of receiving and forwarding, possibly in the form of a relay station, input signals arriving from the surroundings or from a control center or the like. In this case, it is also conceivable for the communication module 6 also to have a radio transmitter that is wirelessly connected to other communication modules 6' of other lighting apparatuses 2' in the system 1, as shown by way of example in FIG. 3. The communication module 6 may then preferably be designed so as to control the lighting apparatus 2 on the basis of the data transmitted from the other communication modules 6' of the other lighting apparatuses 2' or to coordinate the activation of the light source 21, 30 or other data transmission apparatuses across lighting apparatuses within the system 1 or else across systems. Such communication between adjacent lighting apparatuses 2, 2' in the system 1 or else among various systems 1 is desirable and useful when the lighting apparatuses 2, 2' can then be prompted from a particular lighting apparatus 2 to adjust their light output and/or the output of warning information or signals as appropriate. In this connection, it would be conceivable for an accident or the like to be detected in the surroundings of one lighting apparatus 2' and then for the lighting apparatus 2' to use its communication options to prompt the adjacent lighting apparatuses 2 to adjust their light output or information output as appropriate. At a certain interval before the accident location, a lighting apparatus 2, 2' could then be specifically used to transmit and/or visually indicate warning signals, as shown by way of example in FIG. 3.

Besides the transmission of signals (input signals, output signals, etc.) by means of radio communication or PLC, it is also conceivable for the data and information that are to be transmitted to be alternatively or additionally transmitted by modulation of the light source 21, 30. This "Visible Light Communication" (VLC) as data transmission technology is used to transmit data or information using the transmission medium of light, the frequency of the light used for transmission usually being in the visible range between 400 and 800 THz in this case. This can preferably be accomplished by using the already existent light sources 21, 30 or else an additional light source.

In order to evaluate the input signals and to convert them into appropriate actuation signals (or output signals), the communication module 6 preferably has a processing unit. The processing unit is preferably part of the communication module 6 and hence likewise preferably (directly) linked or connected to the lighting apparatus 2.

In this case, the output of the aforementioned information or signals is not limited to the visual presentation of warning information or the like. As already mentioned previously, a lighting apparatus 2 situated at a certain interval before an accident location could in turn be prompted to transmit wireless information to further road users, particularly vehicles F, in the form of a relay station or the like via a car-to-car communication network C. As FIG. 4 shows, for example, it is then possible for the warning information, e.g. advice to reduce speed, to be visually presented or audibly reproduced in the vehicles F on an appropriate reproduction unit 7 with a display 70, lamp elements 71 or loudspeakers 72.

As already mentioned previously, short-haul radio is preferably provided and used for the wireless transmission of the information. To keep the power consumption of the system 1 as low as possible in this case, particularly the Bluetooth standard 4.0 has been found to be advantageous. The Bluetooth 4.0 standard can be used to very quickly set up a connection between the various subscribers and accordingly also receive and present the information almost immediately for/to the road user. The information is not limited to Bluetooth as a transmission standard, however.

Figure 2:
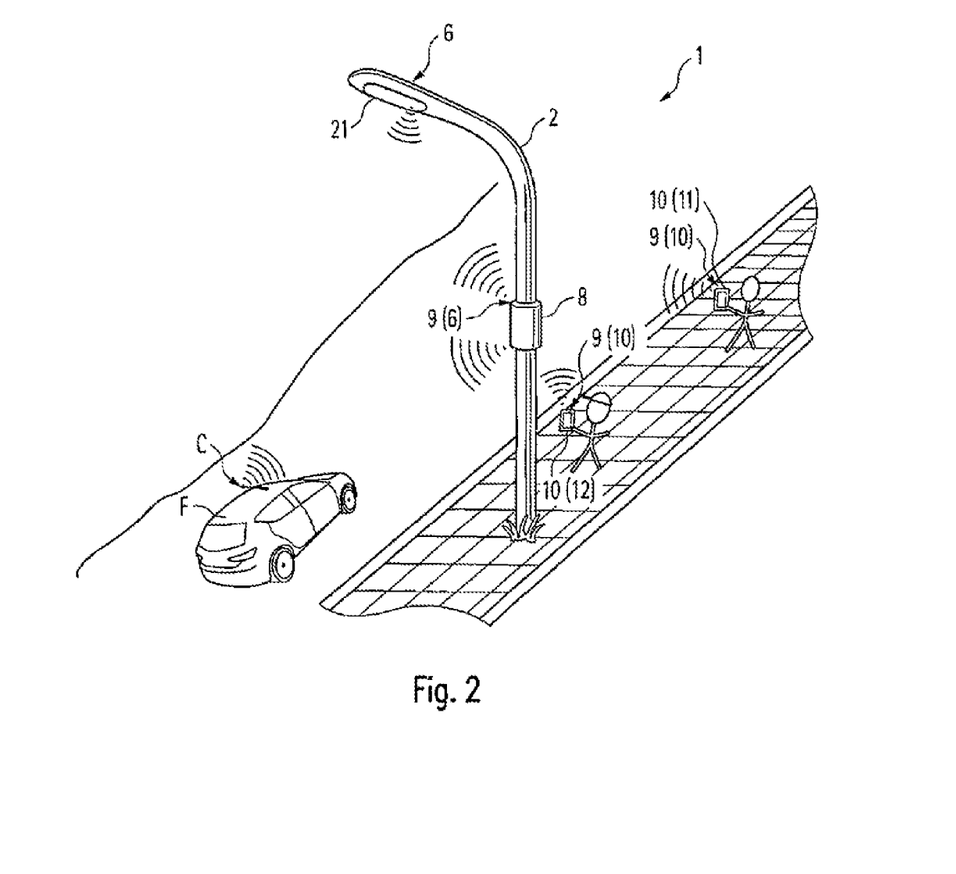
FIG. 2 shows a road or path lighting system according to a second exemplary embodiment.

FIG. 2 shows a second exemplary embodiment of the system 1 according to the invention. Features that are the same are provided with the same reference symbols, so that, to avoid repetition, comprehensive reference is made to the comments relating to the first exemplary embodiment. The features of the exemplary embodiments can each arise individually (cf. FIGS. 1 and 2) or jointly (cf. FIG. 3).

As an alternative or in addition to the projection unit 3 described in the first exemplary embodiment, the system 1 according to the second exemplary embodiment has a lighting apparatus 2 with a light source 21. By way of example, this light source 21 may be an ordinary light source or a projection unit 3 as described above. In addition, a sensor unit 8 is provided that has at least one sensor. The sensors used may be any conceivable sensors, as have also already been described previously by way of example. These may be light sensors, temperature sensors, motion sensors, smoke sensors and the like, for example. These sensors can provide different information, for example information about the exterior light, the volume of the traffic and/or the temperature and the like. In respect of the first exemplary embodiment described above, this information captured by means of the sensors can be used, by way of example, to present or transmit information or signals or to adjust the lighting of the light source 21 (30) or of the projection unit 3. It is also conceivable for the sensor units 8 to be designed such that they transmit signals (input signals, output signals, etc.) in the event of radio connection problems between the luminaire heads or between the communication modules 6, 6' of the lighting apparatuses 2, 2' or between other radio receivers or radio transmitters and the lighting apparatus 2, 2', for example, and thus ensure greater availability of the communication above all in the event of technical faults (e.g. power failure in particular sectors).

The sensor unit 8 is particularly preferably provided on the outside of—rather than in or to some extent in—the lighting apparatus 2 and preferably at an interval from the light source 21, 30. The system 1 according to the second exemplary embodiment likewise has a communication module 6 for actuating the light source 21, 30, which communication module actuates the light source 21, 30 on the basis of the data captured by means of the sensor.

In order to allow the provision of the sensor unit 8 easily and inexpensively and at the same time to provide a system 1 having a high level of situation-dependent light output and information output, the invention dispenses with the provision of a drill hole in the lighting apparatus 2, to be more precise the post 20 thereof, and with the electrical connection via the drill hole and at the electrical equipment of the lighting apparatus 2. Instead, a wireless data communication unit 9 is provided that connects the sensor unit 8 to a receiver of the communication module 6 only wirelessly (that is to say precisely not by cable). To this end, the sensor or the sensor unit 8 is provided or mounted preferably only on the outside of the lighting apparatus, particularly preferably on the outside of the post 20 that has the lighting apparatus 2, but is not electrically connected. It is therefore possible for the sensors to be arranged at an optimum height suited to this purpose, without involving great complexity for the mounting, since the sensor does not need to be electrically connected to appropriate lines that run inside the post.

The wireless connection of the data communication unit 9 is provided preferably by means of short-haul radio, particularly preferably by means of Bluetooth, more particularly preferably by means of Bluetooth 4.0. For the advantages of the Bluetooth standard, particularly the low power requirement thereof, reference is made to the comments above.

So as nevertheless to be able to operate the sensor unit 8 autonomously, it preferably has an independent power source. By way of example, this power source may be a solar module, preferably with an energy buffer, or an internal energy store, such as a storage battery or the like.

The sensor is therefore capable of capturing appropriate information about the surroundings and possibly collecting it in the sensor unit 8. If it is necessary for the operation of the light source 21 or even of a projection unit 3 to be adjusted on the basis of the corresponding external situation (for example appropriate adjustment of the lighting of the light source 21 or output of warning information by means of projection unit 3 (visual) or via communication module 6 (PLC; relay station; etc.)), then appropriate signals are transmitted wirelessly from the sensor or the sensor unit 8 to the lighting apparatus 2. As already described previously, this prompts communication using the communication module 6 at a preferably extremely low power, with the use of the Bluetooth standard being conceivable, for example. In this case, communication is possible over a relatively short range, but one that is sufficient to span the interval between the sensor and the receiver of the communication module 6. Since the sensor usually also does not constantly transmit corresponding signals to the lighting apparatus 2, but rather transmits such information once only when needed, the energy in an energy store as cited above usually suffices for such measures for a long period, so that also any maintenance intervals can be extended and hence in turn costs can be saved.

The communication module 6 has a processing unit in which the input signals, particularly the data captured by the sensor or transmitted from the transmission unit 10, are evaluated and converted into actuation signals or output signals in general. The processing unit is part of the communication module 6 and may be directly connected either to the sensor unit 8 or to the lighting apparatus 2. A data transmitter of the communication module 6 and the receiver of the communication module 6 preferably provide the wireless connection between the sensor unit 8 and the receiver of the communication module 6. If the processing unit is provided in the sensor unit 8, the data transmitter is used to transmit the already generated actuation signals to the receiver of the communication module 6. If, conversely, the processing unit is provided in the lighting apparatus 2, preferably close to or on the light source 21, the data transmitter is used to transmit just the data ascertained by the sensor to the receiver of the communication module 6, which receiver is provided in the lighting apparatus 2 (preferably close to or on the light source 21), and said receiver provides said data for the processing unit for the purpose of generating and transmitting actuation signals.

Figure 3:
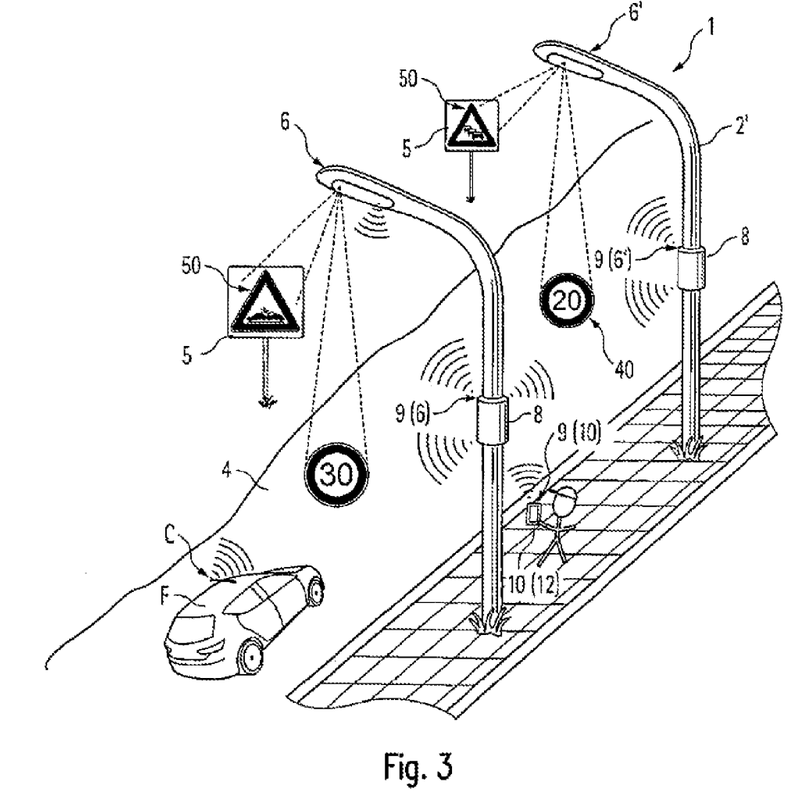
FIG. 3 shows a road or path lighting system according to a third exemplary embodiment.

As in the first exemplary embodiment, the communication module 6 according to the second exemplary embodiment may likewise also have a radio transmitter that is wirelessly connected to other communication modules 6, 6' of other lighting apparatuses 2, 2' in the system 1, as shown by way of example in FIG. 3. The communication module 6 is then also designed so as to control the lighting apparatus 2 on the basis of the data transmitted from the other communication modules 6' of the other lighting apparatuses 2' and to generate the control as appropriate on the basis of the data interchanged between the lighting apparatuses 2, 2'. As already described previously, an additional safety connection can be provided between the lighting apparatuses 2, 2' by means of the sensor units 8, said safety connection undertaking transmission of the signals in the event of a power failure, for example, and hence ensuring communication even in the event of corresponding problems.

Moreover, it is conceivable for the communication module 6 to be designed such that the light source 21 (or else a projection unit 3 according to the first exemplary embodiment) can also be actuated on the basis of data that are transmitted to the communication unit 6 wirelessly from a preferably external transmission module, such as the transmission unit 10 described previously. By way of example, such a transmission module 10 may be a mobile telephone 11 or another, preferably specifically configured, transmission unit 12. The lighting apparatus 2 may then be designed such that it (additionally) reacts to signals supplied externally (that is to say not from the sensor) and, by way of example, adjusts its lighting or the information output in general as appropriate. By way of example, it is possible for (again preferably by means of Bluetooth) the approach of a person who has a smartphone 11 as a transmission module 10 to be detected. The lighting apparatus 2 can then adjust its light output accordingly. In this way, the direct communication between the road user (with the mobile telephone 11) and the lighting apparatus 2 at least partly replaces the sensor or the sensor unit 8.

As already mentioned previously, according to a preferred field of application, communication between lighting apparatuses 2, 2' in a system 1 can also take place according to the second exemplary embodiment and hence allows what is known as progressive light, for example. That is to say that, as a road user (having a transmission module 10) moves, the lighting is adjusted as appropriate, with the greatest brightness being attained in the direct region of the user, whereas appropriate adjustment is already taking place at a distance further on. This in turn means that lighting apparatuses 2 toward which the road user is moving can be prompted to slowly increase their brightness, while others, from which the road user is moving away, can be prompted to slowly decrease their brightness.

The transmission module 10 or another, preferably external, transmitter (for example a traffic management center and the like) also preferably allows the communication module 6 and therefore the lighting apparatus 2 to be parameterized by means of data that are transmitted to the communication module 6 wirelessly or by wire. This is understood to mean individual flexible adjustment of the operation of the lighting apparatus 2, particularly of the light source 21 or of the projection unit 3, to suit the respective location of use and any existing conditions. By way of example, the behavior of the lighting apparatus 2 can be configured on the basis of the time of day. It is also possible to prescribe the way in which the lighting apparatus 2 reacts to the signals provided by the sensor. In this connection, it should be taken into account that the sensor can cover a larger region than is actually desired for the operation of the lighting apparatus 2, for example. If the light source 21 is intended to adjust its brightness on the basis of the presence of pedestrians or the like, for example, it is desirable for the lighting apparatus 2 to react to sensor signals that come from persons moving on the footpath, for example. However, it is not possible to preclude the sensor also reacting to vehicles on the road and the like on the basis of its coverage region. Appropriate information that is then provided by a smartphone or another appliance for parameterizing the lighting apparatus 2 or the communication module 6, for example, allows the intelligence that preferably resides in the lighting apparatus 2 to be set such that only those sensor signals that actually relate to the pedestrian area or the like are taken into account. This means that functionality of the lighting apparatus 2 can be set in situ and adjusted at any time, even at a later instant, in a simple and convenient manner, in particular wirelessly.

The lighting apparatus 2 can also react, preferably in a specific manner, to other externally ascertained information. For this purpose, the communication module 6 may also preferably be designed such that it executes or does not execute actuation of the light source 21, 30 or else the parameterization of the communication module 6 on the basis of an authorization of the transmitter that is transmitting the relevant data, such as the external transmission module 10. Thus, a distinction is preferably drawn between signals that can be transmitted by anyone and signals that can be transmitted specifically only by authorized persons or the like. The simple adjustment of the brightness would be permissible by anyone, for example, whereas specific services such as police, fire brigade or rescue services would be provided with the capability of specifically prompting a light source 21, 30 to illuminate the surrounding area in the event of an accident very brightly or to prompt the lighting apparatus 2 or a projection unit 3 to output warning signals. Naturally, such functions should not be able to be triggered by anyone, which is why a distinction should preferably be made in this case.

The transmission module or the transmission unit 10 can therefore preferably be used in the same manner as the sensor unit 8. The data transmitted from the transmission unit 10 can be made available in the communication unit 6 in the form of the previously described input signals, such data being transmitted from the transmission unit 10 automatically or being generated individually and then transmitted specifically. The transmission unit 10 can preferably also receive the output signals that are output by the communication module 6 or the lighting apparatus 2 and convert them into visual and/or audio signals, for example, as is the case with the reproduction unit 7 shown in FIG. 4. The reproduction unit 7 may then be the transmission unit 10 (particularly a smartphone or a specific reproduction apparatus), for example, which preferably has a display 70, an audio output or a loudspeaker 71 and the like.

It should be noted that, according to the second exemplary embodiment, the transmission unit 10 may consequently also be provided instead of the sensor unit 8 and does not just arise in combination therewith. The system 1 then preferably comprises the lighting apparatus 2 with a light source 21, 30, the transmission unit 10 (for example a mobile telephone 11) having a transmitter, wherein the transmission unit 10 is at an interval from the light source 21, 30, the communication module 6 for actuating the light source 21, 30 on the basis of data transmitted by means of the transmission unit 10, and the wireless data communication unit 9, which connects the transmission unit 10 to the receiver of the communication module 6 only wirelessly. For the purpose of autonomous power supply, the transmission unit 10 also preferably has an independent power source, for example a storage battery.

A method for outputting signals or information by means of the system 1 according to the invention is described below:

First of all, data are transmitted to the lighting apparatus 2 in the system 1. These data are sent to the communication module 6 as input signals and are finally provided for other receivers. To this end, the communication module 6 preferably has a processing unit in which input signals are evaluated and converted into actuation signals or output signals. The input signals can be transmitted to the communication unit via PLC or wirelessly (for example short-haul radio; Bluetooth); by way of example, from a traffic management center, a sensor unit 8 provided on the lighting apparatus 2, an (external) transmission unit 10, 11, 12, a car-to-car communication network C or another transmitter. These input signals may be provided either for the purpose of outputting information or for the purpose of parameterizing the system 1. The actuation signals may be provided either for the purpose of actuating the light source 21 (for example for the purpose of switching on or off or setting the luminosity) or for the purpose of actuating a projection unit 3 that preferably projects visual signals 40, 50 onto a projection area 4, 5 in accordance with the actuation signals. The output signals can be transmitted via PLC or else wirelessly (short-haul radio; relay station) and can be provided, for example in visual and/or audio form, in a traffic management center, a car-to-car communication network C or on other receivers (for example transmission unit 10; smartphone 11; etc.). It is also possible for the output signals to be transmitted to (adjacent) lighting apparatuses 2' in the same or another system 1 and to be provided there as input signals, which, preferably following matching against other input signals, results in combined actuation of a plurality of lighting apparatuses 2, 2' or specific output of output signals.

According to preferred embodiments, the methods for outputting signals 40, 50 by means of the road and path lighting system 1 can proceed as follows:

The road and path lighting system 1 has the lighting apparatus 2, 2' with the projection unit 3 having a light source 21, 30 and the communication module 6, 6'. In a first step, input signals transmitted wirelessly or by wire are received in the communication module 6, 6'. In a further step, the projection unit 3 is actuated by means of the communication module 6, 6' on the basis of the input signals. The signals 40, 50 to be output are then projected onto a projection area 4, 5 by means of the projection unit 3.

According to another embodiment, the road and path lighting system 1 has the lighting apparatus 2, 2' with a light source 21, 30 and also the sensor unit 8 having a sensor and/or the transmission unit 10, 11, 12, 8 having a transmitter, wherein the sensor unit 8 or the transmission unit 10, 11, 12, 8 are preferably provided on the lighting apparatus 2, 2' and at an interval from the light source 21, 30 and preferably have an independent power source. Furthermore, the system 1 has a communication module 6, 6' and a wireless data communication unit 9. In a first step, data captured by means of the sensor or data transmitted by means of the transmission unit 10, 11, 12, 8 are sent or transmitted exclusively wirelessly as input signals to a receiver of the communication module 6, 6' by means of the data communication unit 9. These wirelessly transmitted input signals are received in the communication module 6, 6'. In a further step, the light source 21, 30 is then actuated by means of the communication module 6, 6' and on the basis of the data transmitted by means of the input signals.

In each of the aforementioned exemplary embodiments, the light source 21, 30 may at least also be a projection unit 3 or the projection unit 3 may have an appropriate light source 21, 30 (for example a laser light source). This can project one or more signals 40, 50 onto one or more projection areas 4, 5, wherein the signals 40, 50 preferably form visual signals 40, 50 on the at least one projection area 4, 5.

The aforementioned exemplary embodiments of the methods may also have the steps of output signals being generated by the communication module 6, 6' and on the basis of the received input signals, which are then output to the surroundings, for example via power line communication, short-haul radio or as a relay station, preferably to a traffic management center or a car-to-car communication network C or another communication module 6', 6 of a further lighting apparatus 2', 2 in the system 1.

The input signals are transmitted to the communication module 6, 6' preferably as data signals via power line communication or from sensors, for example a sensor unit 8 of the system 1 or a surrounding road system, or from a car-to-car communication network C or another, preferably external, transmission unit 10, 11, 12, 8.

On the basis of the methods described previously, it is also possible, in a further step, for the lighting apparatus 2, 2', preferably the communication module 6, 6', to be parameterized by means of data transmitted to the communication module 6, 6' wirelessly or by wire. The parameterization of the communication module 6, 6' can be executed or not executed particularly preferably on the basis of an authorization of the transmitter that transmits the data, such as the external transmission module 10, 11, 12, 8.

The present invention is not limited to the exemplary embodiments described previously so long as it is covered by the subject matter of the claims that follow. Thus, the individual features of the exemplary embodiments can be interchanged and/or combined with one another as desired. It goes without saying that, as FIG. 3 shows, the features of the aforementioned exemplary embodiments may also be present jointly or severally so long as they are covered by the subject matter of the claims that follow.

The invention claimed is:

1. A road and path lighting system having:
    a lighting apparatus with a light source,
    a sensor unit having a sensor, wherein the sensor unit is provided on the lighting apparatus,
    a communication module for actuating the light source on the basis of data captured by the sensor, and
    a wireless data communication unit that connects the sensor unit to a receiver of the communication module only wirelessly,
    wherein the sensor unit has an independent power source and is designed such that the sensor unit transmits signals in the event of radio connection problems between the communication module or the wireless data communication unit and the lighting apparatus.

2. The road and path lighting system as claimed in claim 1, wherein the sensor comprises light sensors, temperature sensors, motion sensors or smoke sensors, and wherein the communication module is configured to actuate the light source on the basis of one or more light conditions sensed by the light sensor, the temperature sensed by the temperature sensor, mobile objects situated in a sensing region of the motion sensor or smoke density sensed by the smoke sensor.

3. The road and path lighting system as claimed in claim 1, wherein the sensor or the sensor unit is provided on the outside of the lighting apparatus, on the outside of a post that has the lighting apparatus or an upper end of the lighting apparatus has a projection unit arranged on it.

4. The road and path lighting system as claimed in claim 1, wherein the wireless connection is provided by a Bluetoothshort-haul radio.

5. The road and path lighting system as claimed in claim 1, wherein the power source is a solar module, with one of an energy buffer, or an internal energy store.

6. The road and path lighting system as claimed in claim 1, wherein the communication module is designed such that the lighting apparatus can also be actuated on the basis of data from an external transmission module, that are transmitted to the communication unit wirelessly.

7. The road and path lighting system as claimed in claim 6, wherein the communication module is designed to execute or not to execute actuation of the lighting apparatus or parameterization of the communication module on the basis of an authorization of the wireless data communication unit that transmits the data.

8. The road and path lighting system as claimed in claim 1, wherein the lighting apparatus, can be parameterized by data that is transmitted to the communication module wirelessly or by wire.

9. The road and path lighting system as claimed in claim 1, wherein the communication module also has a radio transmitter that is wirelessly connected to other communication modules of other lighting apparatuses in the system, wherein the communication module is also designed so as to control the lighting apparatus on the basis of the data transmitted from the other communication modules of the other lighting apparatuses.

10. The road and path lighting system as claimed in claim 1, wherein the communication module has a processing unit in which the data captured by the sensor are evaluated and converted into actuation signals,
    wherein the processing unit is directly connected either to the sensor unit or to the or to the lighting apparatus, and
    wherein a data transmitter of the communication module, located on one of the sensor unit, provides a wireless connection between the sensor unit and a receiver of the communication module.

11. A method for outputting signals by a road and path lighting system having a lighting apparatus with a light source, a sensor unit having a sensor or a transmission unit having a transmitter, wherein the sensor unit or the transmission unit has an independent power source, a communication module, and a wireless data communication unit, wherein the method has the following steps:
    wireless transmission of data captured by the sensor or of data transmitted by the transmission unit as input signals to a receiver of the communication module by the data communication unit,
    reception of the wirelessly transmitted input signals in the communication module, actuation of the light source by the communication module on the basis of the transmitted data, and
    transmission of signals by the sensor unit in the event of radio connection problems between the communication module or the wireless data communication unit and the lighting apparatus.

12. The method as claimed in claim 11, wherein the light source is a projection unit that projects one or more signals onto one or more projection areas, wherein the signals form visual signals on at least one projection area.

13. The method as claimed in claim 11, wherein the input signals are transmitted to the communication module as data signals from one of a power line communication, a sensor unit of the system, a surrounding road system, a car-to-car communication network or an external transmission unit.

14. The method as claimed in claim 11, also having the step of:
    parameterization of the lighting apparatus, of the communication module, using data transmitted to the communication module wirelessly or by wire,
    wherein the parameterization of the communication module is executed or not executed on the basis of an authorization of a transmitter that transmits the data.

* * * * *

UNITED STATES PATENT AND TRADEMARK OFFICE
CERTIFICATE OF CORRECTION

PATENT NO. : 9,679,482 B2
APPLICATION NO. : 14/396706
DATED : June 13, 2017
INVENTOR(S) : Walter Werner et al.

It is certified that error appears in the above-identified patent and that said Letters Patent is hereby corrected as shown below:

In the Claims

Column 16, Line 10, Claim 10:
After "is directly connected"
Delete "either"

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*